United States Patent [19]

Badger

[11] Patent Number: 5,408,440

[45] Date of Patent: Apr. 18, 1995

[54] HYDROPHONE CIRCUIT WITH ELECTRICAL CHARACTERISTICS OF A GEOPHONE

[75] Inventor: Algernon S. Badger, E. Bernard, Tex.

[73] Assignee: Western Atlas International, Inc., Houston, Tex.

[21] Appl. No.: 34,364

[22] Filed: Mar. 19, 1993

[51] Int. Cl.[6] ............................................. G01V 1/38
[52] U.S. Cl. ..................................... 367/13; 181/110; 367/24
[58] Field of Search ....................... 367/13, 24, 43, 911; 181/110

[56] References Cited

U.S. PATENT DOCUMENTS

| | | | |
|---|---|---|---|
| 4,253,164 | 2/1981 | Hall, Jr. | 367/21 |
| 4,520,467 | 5/1985 | Berni | 367/21 |
| 4,979,150 | 12/1990 | Barr | 367/24 |
| 5,163,028 | 11/1992 | Barr et al. | 367/13 |
| 5,235,554 | 8/1993 | Barr et al. | 367/13 |

*Primary Examiner*—Daniel T. Pihulic
*Attorney, Agent, or Firm*—Arnold, White & Durkee

[57] ABSTRACT

A hydrophone-filter with the frequency response characteristics of a geophone utilizes a second order high pass filter wherein one capacitive element of the filter is the hydrophone itself. The filter includes an amplifier, wherein one input receives a biasing voltage from a resistive network, and the other input receives a signal provided by one or more hydrophones. The filter also includes one or more capacitive elements and one or more resistive elements. The natural frequency and slope of the filter depend upon the values of the capacitive elements of the circuit, including the capacitance of the hydrophones, as well as the values of the resistive elements of the circuit. Advantageously, the natural frequency of the hydrophone-filter remains constant even if the magnitude of the hydrophone's output changes.

24 Claims, 9 Drawing Sheets

HYDROPHONE CIRCUIT WITH ELECTRICAL CHARACTERISTICS OF A GEOPHONE

BACKGROUND OF THE INVENTION

1. Field of Invention

The present invention relates to hydrophones employed in seismic exploration. More particularly, the invention relates to an improved hydrophone circuit that provides the electrical characteristics of a geophone by employing a second order high pass filter, wherein one capacitive element of the filter is a hydrophone.

2. Description of Related Art

Due to the increasing difficulty and cost of finding petroleum resources in the world today, exploration techniques are becoming more and more technologically sophisticated. For example, many have found crystal hydrophones to be useful in petroleum exploration. Basically, hydrophones are used to measure seismic waves created by a source such as an air gun or a dynamite charge, to obtain detailed information about various sub-surface strata of earth.

As shown in FIG. 1, a typical crystal hydrophone 100 includes a diaphragm 102, a crystal 104, and a housing 106 that is typically filled with a gas 107. The diaphragm 102, which has front and rear sides 102a, 102b, is made from a material such as Kovar TM or a Beryllium Copper compound, and is electrically connected to the crystal by a conductive epoxy 108. The crystal 104 is made from a material such as Lead Zirconium Titanate, and is silver-plated on its top 104a and bottom 104b to achieve better conductivity. The crystal 104 is initially polarized by applying a high-voltage electrical charge to the crystal 104. When the polarized crystal 104 experiences pressure resulting from a physical input such as sound, fluid pressure, or another type of pressure, it produces a voltage representative of the pressure experienced. The crystal 104 is electrically connected to electrical output leads 110, 112. To protect the crystal 104 from contaminants, and to maintain the crystal 104 in atmospheric pressure, the crystal 104 and the rear side 102b of the diaphragm 102 are sealed within the gas-filled housing 106. The housing 106 protects the crystal 104 and diaphragm 102, and facilitates mounting of the hydrophone 100.

The diaphragm 102 functions to vibrate in response to physical pressures it experiences. The physical deflection of the diaphragm 102 is transferred by the epoxy 108 to the crystal 104, deforming the electron structure of the crystal 104 and causing an electrical potential to be provided across the leads 110, 112.

Another apparatus that is also useful in petroleum exploration is the geophone. Geophones are commonly used to measure the motion of the earth's surface in response to seismic waves created by a seismic source, to obtain detailed information about various sub-surface strata in the earth.

As mentioned above, hydrophones and geophones are often used in petroleum exploration in conjunction with seismic equipment. In one example of such an application (FIG. 1B), a cable 150 including one or more hydrophones and one or more geophones is placed on the sea floor 154. Such a cable may be made up of cylindrical units 152, where each unit 152 includes a gimbaled geophone and a hydrophone. An example is the "ocean bottom cable" (OBC) system manufactured by Halliburton Geophysical Services; the OBC system utilizes six model SGH-2 hydrophone-geophone units, which are also manufactured by Halliburton Geophysical Services.

Seismic waves are produced by a seismic source 156 that is towed behind a ship; the seismic source 156 may comprise an air gun, a dynamite charge, or the like. The seismic source 156 produces a large explosion, creating seismic waves 160. The seismic waves 160 travel through water 162 and various layers of earth 164, and are reflected back to the cable 150 as upgoing incident waves 161. Each unit 152 detects and measures the incident waves 161 and creates a real-time record of the results. This record is typically stored in a recorder (not shown) that is linked to or contained within the cable 150. Records of this nature help geologists determine the makeup of the earth 164.

One problem with this arrangement, however, is surface ghost signals 166. Surface ghost signals 166 are produced by incident waves 161 that are reflected from the water's surface 168. At the wavelengths typically used for seismic signals, the surface 168 provides an effective mirror to reflect incident waves 161 and create downgoing surface ghost signals 166. Surface ghost signals 166 contain no additional information regarding the composition of the earth 164 or the possible petroleum deposits therein, and they interfere with the proper receipt and interpretation of the incident waves 161. Accordingly, it is desirable to eliminate the errors introduced by the surface ghost signals 166.

A hydrophone-geophone combination, in theory, is naturally suited to eliminate surface ghost signals. Generally, hydrophones detect pressure omnidirectionally, and geophones detect velocity, which is directional. Due to the relative strengths of the incident waves 161 and the surface ghost signals 166 at different depths, a hydrophone's output and a geophone's output will both vary with depth. For a seismic wave 161 of a given magnitude and frequency, a hydrophone's output will vary with depth sinusoidally (curve 180, FIG. 1C). Likewise, for the given seismic wave 161, a geophone's output will vary sinusoidally with depth (curve 182, FIG. 1C). The hydrophone and geophone outputs may be scaled by external circuitry or by a mathematical algorithm in a computer, so that their peak values have the same amplitude; for example, in FIG. 1C, the hydrophone and geophone outputs are scaled to a maximum peak amplitude of 1 and a minimum peak amplitude of −1. After such scaling, the sum of the hydrophone and geophone outputs will always be 1, irrespective of the depth at which the hydrophone and geophone are both located (curve 184, FIG. 1C). Therefore, in theory, a hydrophone output and a geophone output may be combined to effectively eliminate the influence of surface ghost signals 166.

One problem in applying this theory is that the frequency responses of hydrophones and geophones differ. Therefore, the hydrophone and geophone outputs will only complement each other as shown in FIG. 1C when the seismic wave 160 has a certain frequency. As a result, if the frequency of the seismic wave 160 were to change, the combined hydrophone-geophone output 184 would no longer be constant.

The difference between frequency responses of hydrophones and geophones will now be explained with reference to FIGS. 2–5. When an electronic amplifier 200 (FIG. 2) is utilized to amplify the output of a typical hydrophone 202, the frequency response of the hydrophone 202 (FIGS. 3A, 3B) resembles that of a single-pole high pass filter, since it exhibits a single pole and a 6 dB/octave slope at frequencies less than its natural frequency ($f_n$). The amplifier 200 may comprise an operational amplifier. The hydrophone may be modeled as a voltage source 202a and a capacitor 202b in series; the capacitor 202b and resistance 204 provide the single pole, and hence the 6 dB/octave slope. The natural frequency of the hydrophone 202 depends upon the value of the internal resistance 204 (R) of the amplifier 200 and the capacitance (C) of the capacitor 202b; this relationship is shown in equation 1.0, below.

$$f_n = \frac{1}{2\pi RC} \text{ (Hz)} \quad [1.0]$$

In contrast to the hydrophone 202, the frequency response of a typical geophone resembles a double-pole high pass filter with a 12 dB/octave slope at frequencies less than its natural frequency (FIGS. 4A, 4B). The geophone's frequency response generally explained can be understood by considering the structure of a geophone. A typical geophone (not shown) includes a coil of wire that is positioned within a magnetic field and contained within a case. The coil is suspended by springs and tends to remain fixed in space due to its mass, while the case and magnetic structure vibrate with the motion of the earth's surface. The relative movement of the electrical coil within the magnetic field induces an electrical voltage across the coil, representative of the motion of the earth's surface. A damping resistor is connected across the coil to create a loop and thereby permit current to flow through the coil in proportion to the coil's velocity relative to the magnetic field. This flowing current has the effect of damping the coil's motion due to the force placed on the electrified loop by the magnetic field. This damping facilitates a more accurate representation of the seismic signals received by the hydrophone.

This mechanical system may be modeled as an electromechanical system, a typical application of which is shown in FIG. 4C. A geophone model 400 is electrically connected to a damping resistor 402, as discussed above, and an amplifier 404. The geophone model 400 includes a voltage source 406 to represent the velocity of the geophone case multipled by the transduction constant of the geophone. The model 400 also includes a capacitor 408 to represent the mass of the moving coil (i.e., C=aM). An inductor 410 is shown to represent the spring constant of the coil suspension (i.e., L=a/k). The model 400 also includes a first resistor 412 to represent the "coil form damping", i.e., the mechanical damping of the moving coil caused by eddy currents therein. A second resistor 414 represents the electrical resistance of the coil. The damping resistor 402, in combination with the input resistance of amplifier 404 and the coil resistance 414, is selected to electrically damp the geophone's response, as discussed above. In an exemplary embodiment, the damping resistor 402 is chosen to achieve 70% of critical damping. The geophone's natural frequency is calculated as shown in equation 2.0, below.

$$f_n = \frac{1}{2\pi\sqrt{LC}} = \frac{1}{2\pi}\sqrt{\frac{K}{M}} \text{ (Hz)} \quad [2.0]$$

A geophone's frequency response, then, resembles a high pass second order electronic filter, since the geophone's equivalent circuit contains two impedance elements: the capacitor 408 and the inductor 410. Although the geophone model 400 acts like a resonant circuit, the output signal at the natural frequency is typically 3 dB lower than the asymptotic value due to the 70% damping provided by the damping resistor 402 in combination with the input resistance of the amplifier 404 and the coil resistance 414.

For the reasons explained above, hydrophones and geophones have different frequency response characteristics. Accordingly, hydrophones and geophones are not naturally suited to eliminate ghost signals 166 across the whole spectrum of desired frequency. To use a hydrophone with a geophone advantageously, the frequency response of the hydrophone must match the frequency response of the geophone. One approach to this problem has been to cascade the output of the op-amp 200 with a circuit 500 (FIG. 5) that includes a resistor 502 and a capacitor 504. However, the frequency response of such a circuit still differs from the frequency response of a geophone. Even though the addition of the capacitor 504 provides a second pole, the modified hydrophone circuit is still not a resonant circuit, and therefore the gain at the hydrophone's natural frequency is 6 dB down rather than 3 dB down.

Due to the limitations of this approach, some have used transformers in conjunction with hydrophones to obtain a frequency response that matches that of a geophone. Although a transformer may be advantageously used to bring the output of the hydrophone into conformance with that of a geophone at a particular output level of the hydrophone, there are a number of significant limitations. In particular, the magnitude and phase of the signal produced by the transformer-coupled hydrophone varies with the magnitude of the electrical output signal produced by the hydrophone, due to non-linearities of the transformer core. Furthermore, the natural frequency of the transformer-coupled hydrophone also varies with the magnitude of the electrical output signal provided by the hydrophone. FIG. 6 shows how the natural frequencies of two sample transformer-coupled hydrophones vary over a range of different hydrophone output amplitudes. The tests of FIG. 6 were conducted with an Oyo MP-24 transformer-coupled hydrophone. The use of a transformer to configure the output of a hydrophone to that of a geophone, then, is limited, since the hydrophone's output will not compliment the geophone's output for all amplitudes of the hydrophone's operating range.

This is more clearly illustrated in FIGS. 7 and 8, which show the frequency response of a conventional transformer-coupled hydrophone. In FIGS. 7 and 8, one sample curve was taken with a first seismic input, and the other sample curve was taken with a second seismic input ten times greater than the first.

In FIG. 7, the horizontal axis represents frequency in increments of 1 Hz. The vertical axis represents the magnitude of the transformer-coupled hydrophone's output. In particular, the voltage output of the transformer-coupled hydrophone was measured and compared to the voltage output of an arbitrarily selected, standard hydrophone with excellent low frequency response. In other words, the voltage output of the standard hydrophone was constant over the range of frequencies tested. The outputs of the standard hydrophone and the transformer-coupled hydrophone under test were compared using the formula of equation 3.0, below.

$$\text{relative magnitude} = \quad [3.0]$$
$$20 \log_{10} \frac{\text{(voltage ouput of transformer-coupled hydrophone)}}{\text{(voltage ouput of standard hydrophone)}} \text{(dB)}$$

As seen in FIG. 7, the relative magnitude of the transformer-coupled hydrophone varied when the seismic input signal was increased.

In FIG. 8, the horizontal axis represents frequency in increments of 1 Hz. The vertical axis represents the phase of the transformer-coupled hydrophone's output, in degrees. FIG. 8 illustrates that the phase of the transformer-coupled hydrophone varied when the seismic input signal was increased.

In addition to the transformer-related problems mentioned above, transformers are not always as cost efficient as might be desired. Moreover, transformers are not always as free from distortion as some might require; transformers typically suffer from non-linearity due to power losses caused by hysteresis, eddy currents, "$I^2R$", and other inefficient characteristics.

SUMMARY OF THE INVENTION

The present invention is generally directed at the problems set forth above. The invention comprises a hydrophone incorporated into a hydrophone-filter. The hydrophone-filter achieves the frequency response characteristics of a geophone without utilizing transformers. Specifically, the amplitude response slope, natural frequency, and damping of the filter's frequency response duplicate that of a geophone.

In one embodiment of the invention, the amplifier of the invention may utilize an op-amp configured as an active high-pass filter. This filter receives its input from the hydrophone, which also functions as a capacitive element of the filter. The non-inverting input of the op-amp receives a voltage signal from the hydrophone through a first capacitor, and the inverting input is electrically connected to the output of the op-amp to make a unity gain follower. A first resistor feeds signal back from an op-amp output to the junction of the hydrophone and the first capacitor. A second resistor returns the non-inverting first input to ground to establish d.c. bias and to provide the desired frequency characteristics.

The natural frequency and slope of the hydrophone-filter depend upon the values of the resistive and capacitive elements in the circuit, including the capacitance of the hydrophone. By appropriately adjusting the resistors and capacitors of the filter, the filter can be configured to provide a frequency response wherein: (1) the filter's natural frequency matches that of a designated geophone; (2) the damping provided by the filter resembles the damping of the designated geophone, and (3) the slope of the filter's output below its natural frequency is 12 dB/octave.

The outputs of the hydrophone-filter and a geophone may be scaled and combined by a computer to produce a seismic response signal free from surface ghost signals.

BRIEF DESCRIPTION OF THE DRAWINGS

The nature of the invention, as well as objects and advantages thereof, will become more apparent to those skilled in the art after considering the following detailed description in connection with the accompanying drawings, in which like reference numerals designate like parts throughout, wherein.

DESCRIPTION OF A PREFERRED EMBODIMENT

Structure

Figure 1A:
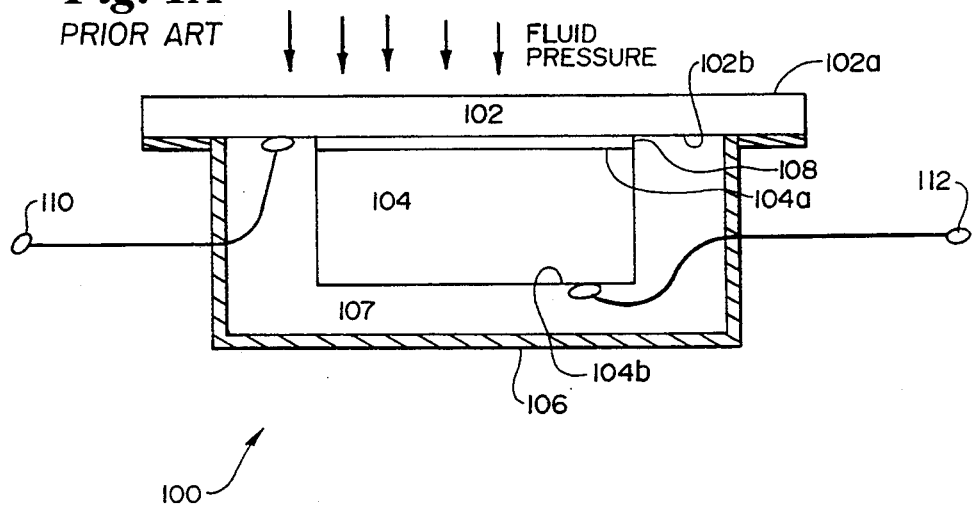
FIG. 1A is a cross-sectional side view of a typical hydrophone 100.
Figure 1B:
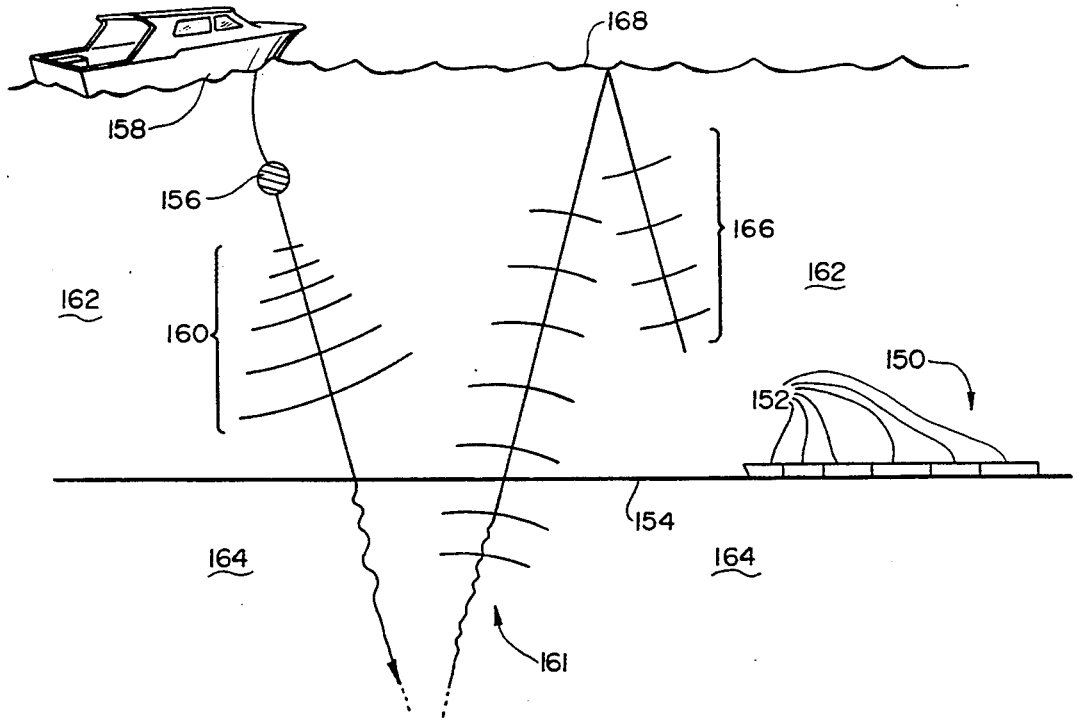
FIG. 1B is a drawing illustrating the use of an ocean bottom cable 150 in conjunction with seismic equipment, for petroleum exploration.
Figure 1C:
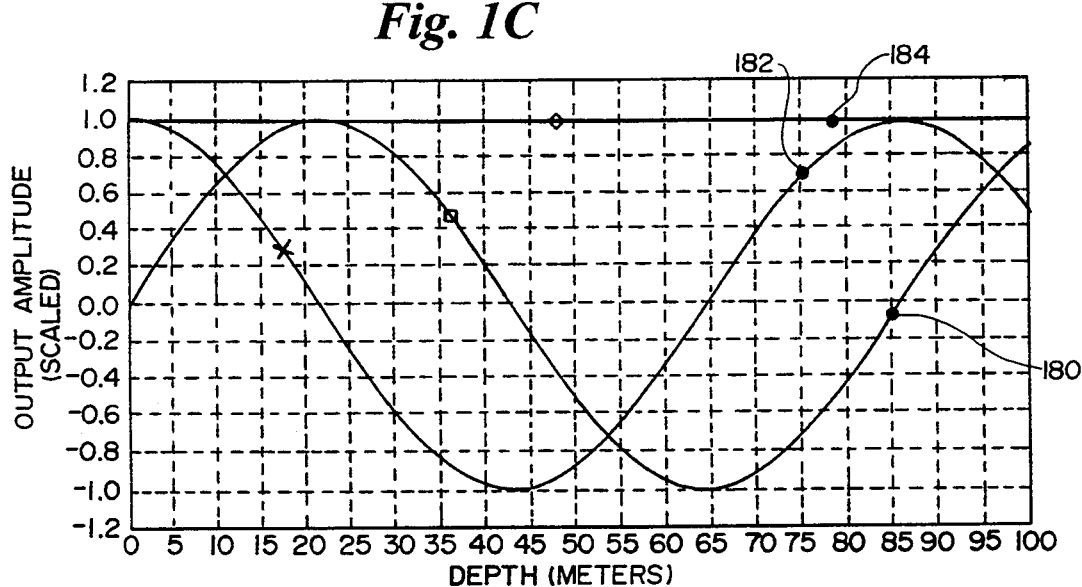
FIG. 1C is a graph illustrating how, in theory, the output of a hydrophone and the output of a geophone may be combined to negate the influence of surface ghost signals.
Figure 2:
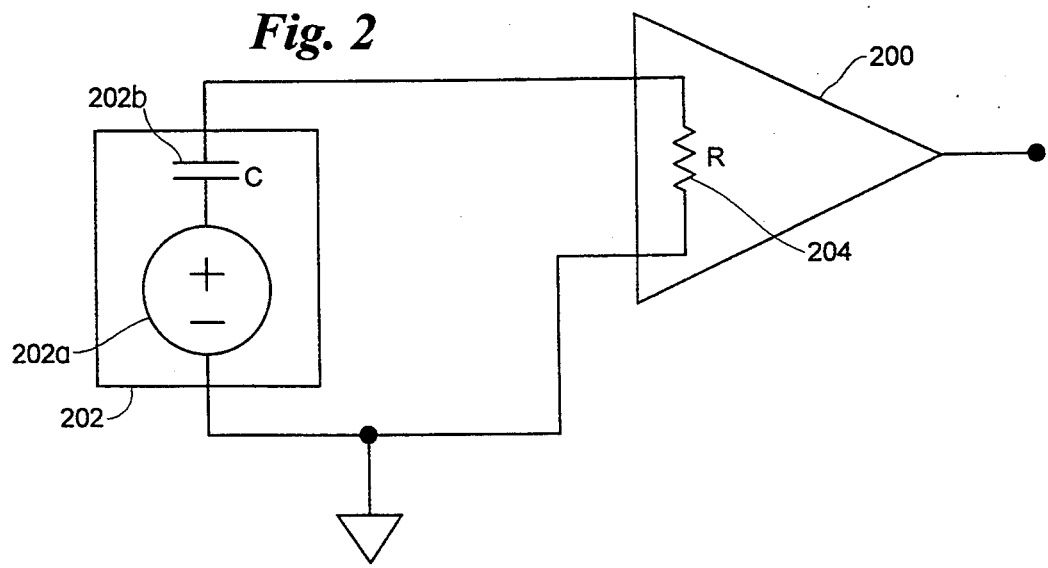
FIG. 2 is an electrical schematic of a simple hydrophone-amplifier.
Figure 3A:
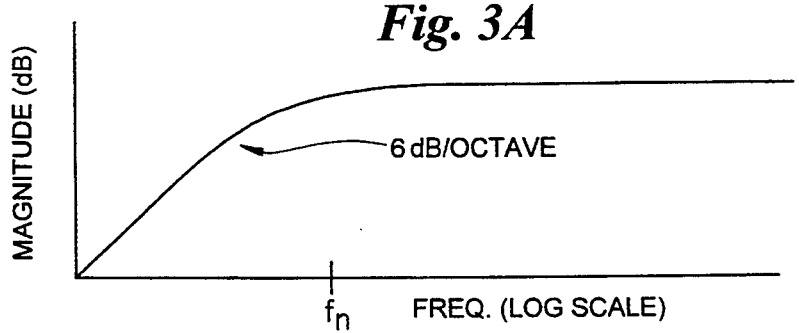
FIG. 3A is a graph illustrating the frequency response (magnitude) of a hydrophone coupled to an amplifier.
Figure 3B:
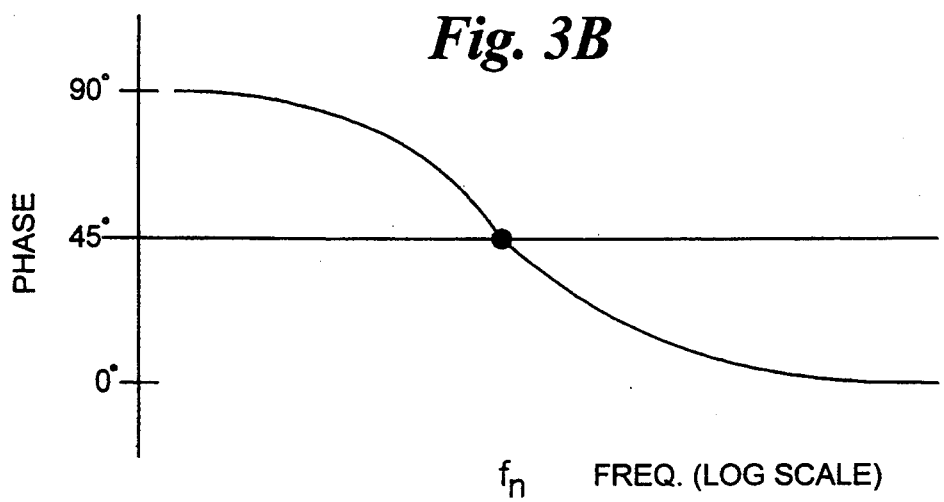
FIG. 3B is a graph illustrating the frequency response (phase) of a hydrophone coupled to an amplifier.
Figure 4A:
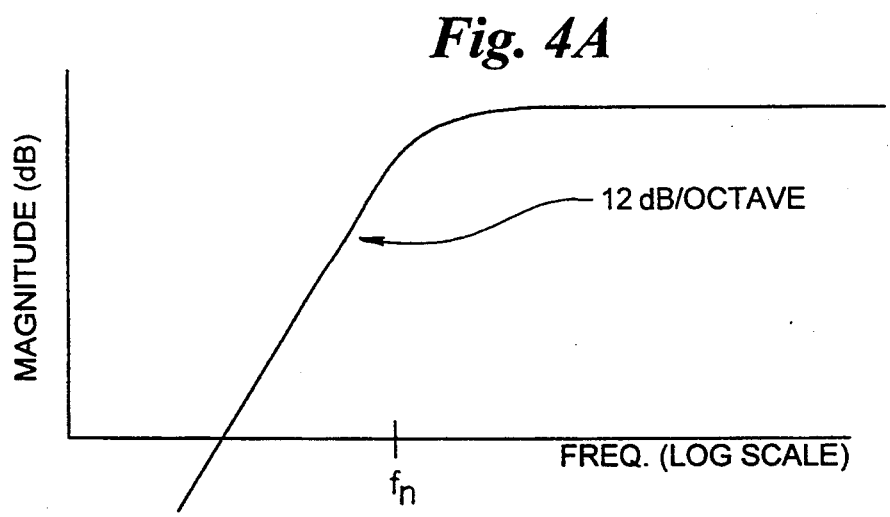
FIG. 4A is a graph illustrating the frequency response (magnitude) of a geophone.
Figure 4B:
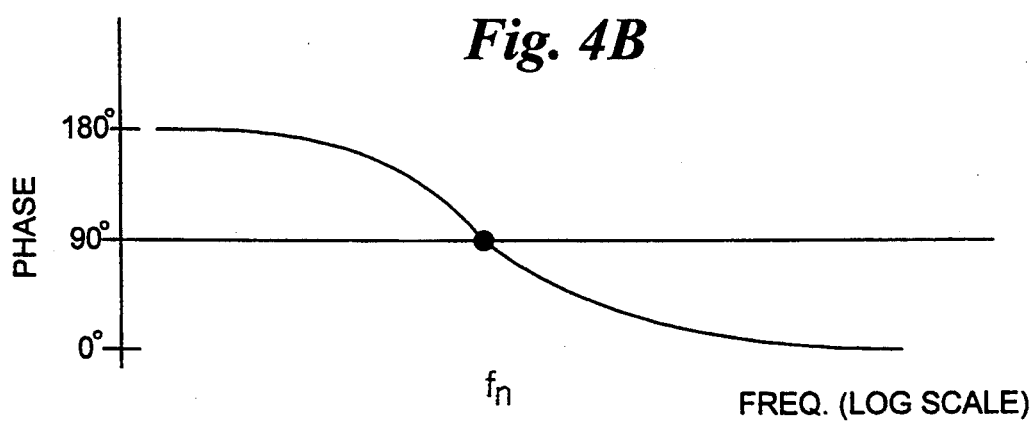
FIG. 4B is a graph illustrating the frequency response (phase) of a geophone.
Figure 4C:
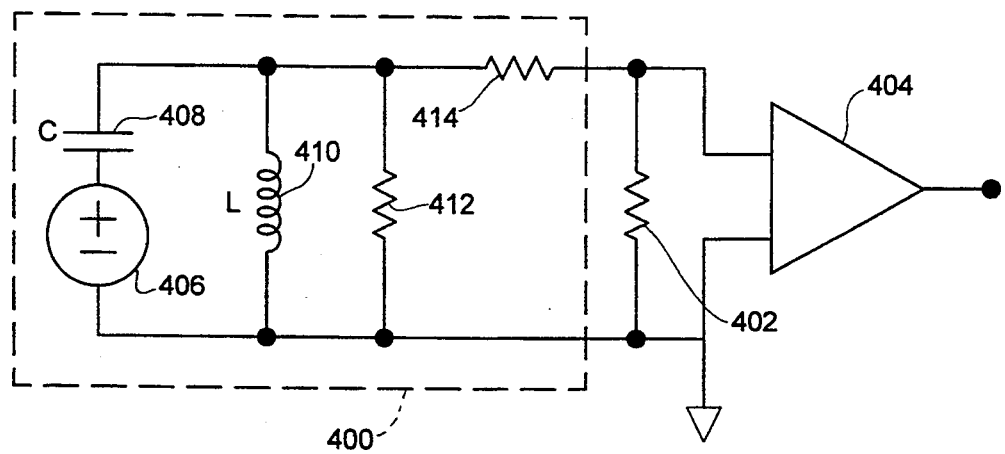
FIG. 4C is a diagram showing an electromechanical model of a geophone.
Figure 5:
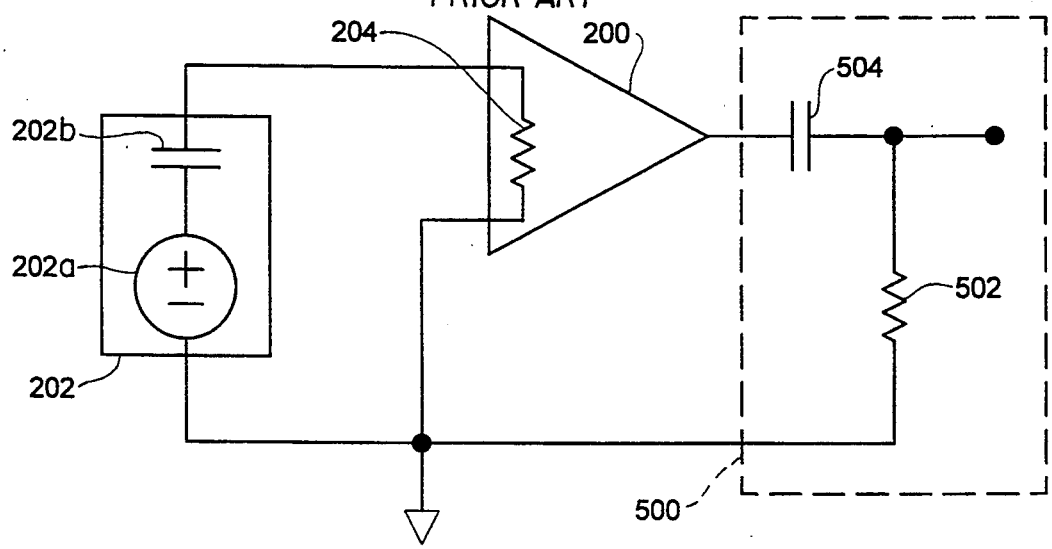
FIG. 5 is an electrical schematic of a cascaded hydrophone-filter.
Figure 6:
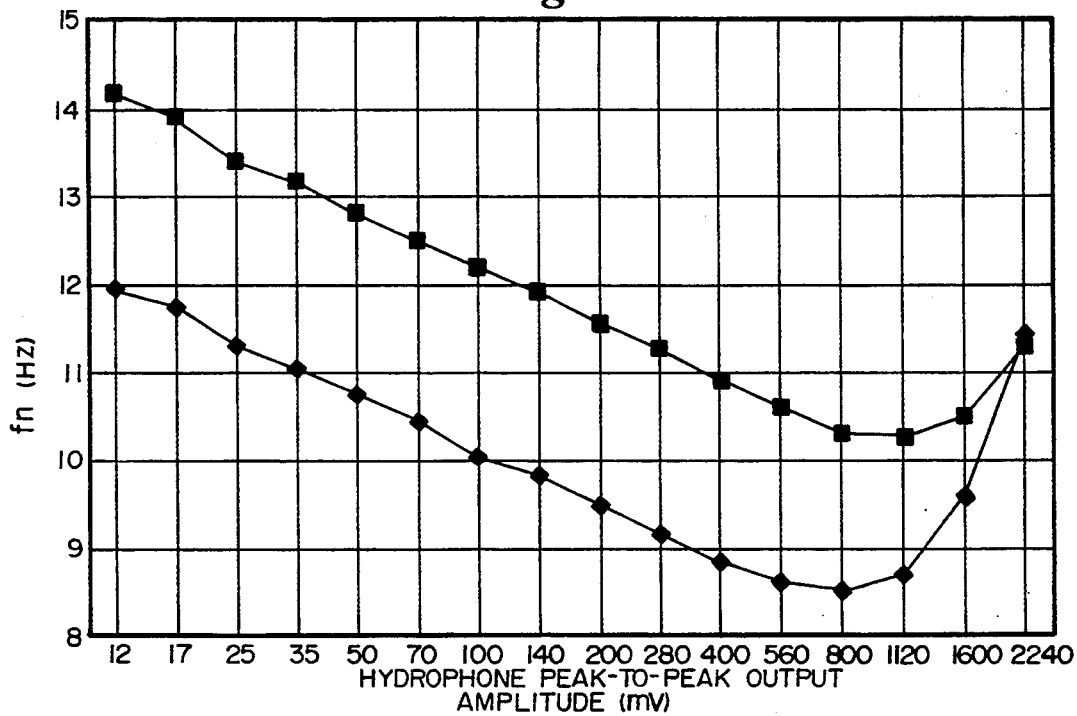
FIG. 6 is a graph illustrating how the natural frequency of a transformer-coupled hydrophone varies with the hydrophone's output.
Figure 7:
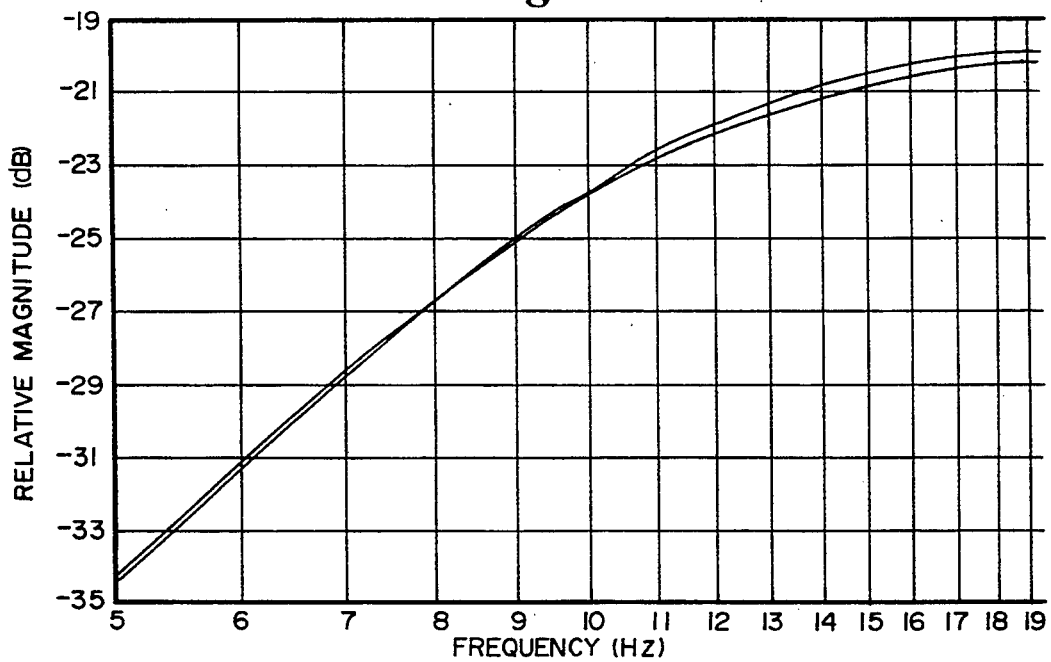
FIG. 7 is a graph illustrating the frequency response (magnitude) of a transformer-coupled hydrophone at two amplitudes of hydrophone output.
Figure 8:
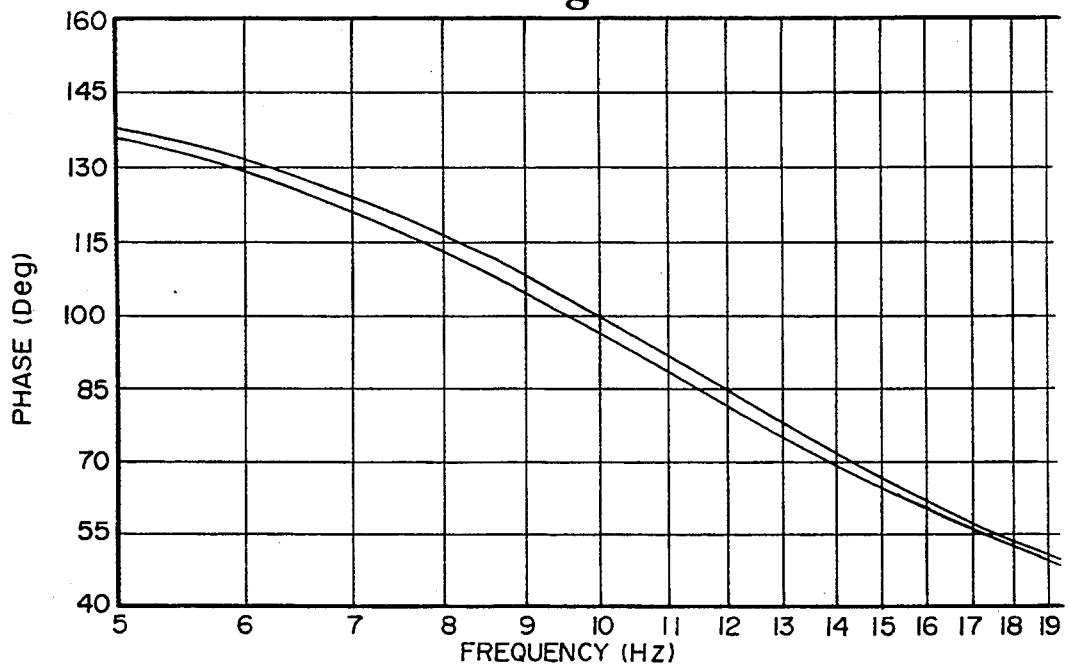
FIG. 8 is a graph illustrating the frequency response (phase) of a transformer-coupled hydrophone at two amplitudes of hydrophone output.
Figure 9A:
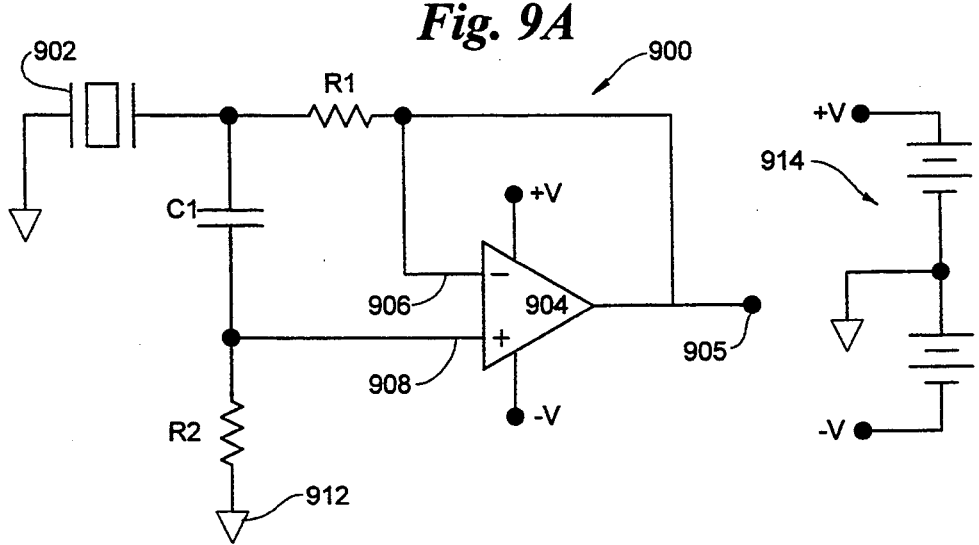
FIG. 9A is an electrical schematic of an improved hydrophone-filter 900 in accordance with the present invention.

In a preferred embodiment (FIG. 9A), the invention includes a high-pass second order filter 900, with its input provided by a hydrophone 902. Although the use of multiple hydrophones in the filter 900 is contemplated, only one hydrophone 902 is shown for simplicity. The hydrophone 902 has a capacitance of $C_h$, and therefore it operates as a capacitive element of the filter 900. The filter 900 includes an op-amp 904 configured as a unity gain buffer, with its output 905 connected to its inverting input 906. The op-amp 904 may comprise a standard op-amp, such as a National Semiconductor model LM741 op-amp. A resistor R1 is electrically interposed between the output 905 and the hydrophone 902. A capacitive element C1 is electrically interposed between the hydrophone 902 and the non-inverting input 908 of the op-amp 904. A resistor R2 is electrically interposed between the non-inverting input 908 of the op-amp 904 and ground 912. The op-amp 904 receives two d.c. bias voltages from a pair of batteries 914, enabling the op-amp 904 to operate between positive and negative rail voltages.

The natural frequency of the filter 900 described above may be calculated as shown in equation 4.0, below.

$$f_n = \frac{1}{(2\pi)(R1 \cdot R2 \cdot C1 \cdot C_h)^{\frac{1}{2}}} \text{ (Hz)} \quad [4.0]$$

Figure 9B:
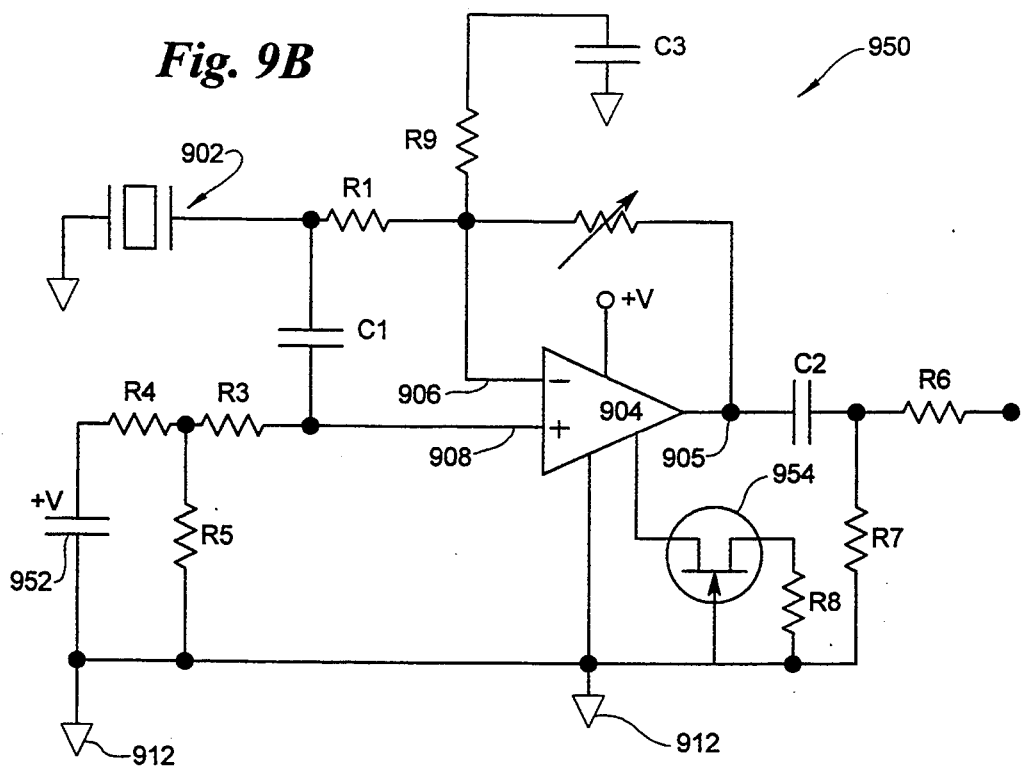
FIG. 9B is an electrical schematic of an improved hydrophone-filter 950 in accordance with the present invention.

An alternative embodiment of the filter 900 may be constructed by modifying the filter 900 in several respects, as shown in FIG. 9B. The filter 950 provides the desired frequency response, but only requires a single power supply 952. As with the filter 900, the filter 950 includes the op-amp 904; the resistor R1, electrically interposed between the hydrophone 902 and the inverting input 906 of the op-amp 904; and the capacitive element C1, electrically interposed between the hydrophone 902 and the noninverting input 908 of the op-amp 904.

Unlike the filter 900, however, a resistor R3 is electrically connected to the non-inverting input 908 of the op-amp 904, and a resistor R4 is electrically interposed between the resistor R3 and the power supply 952. The power supply 952 functions to bias the filter 950 as desired, and may comprise a single d.c. battery. As explained in more detail below, only one bias voltage is used; therefore, the op-amp 904 operates between 0 volts and the bias voltage, and the power supply 952 operates to bias the voltage of the non-inverting input 908 within this range. The filter 950 also includes a resistor R5, electrically interposed between electrical ground 912 and the junction between the resistors R3 and R4.

The natural frequency of the filter 950 may be calculated as shown in equation 5.0, below.

$$f_n = \frac{1}{2\pi \sqrt{R_1 \left[ R_3 + \left( \frac{R_4 R_5}{R_4 + R_5} \right) \right] C_1 C_h}} \text{ (Hz)} \quad [5.0]$$

The output of the op-amp 905 is directed to a capacitive coupling element C2, and a resistor R7 to remove d.c. voltage from the output. A resistor R6 and serves to define an output resistance to allow parallel combination of multiple hydrophones in arrays. The op-amp 904 may comprise a National Semiconductor model LM4250 amplifier. If a model LM4250 op-amp is used, the filter 950 additionally includes a field effect transistor (FET) 954 and a resistor R8 to bias the op-amp 904. The FET 954 may comprise a Siliconix model 2N2659 transistor.

The filter 950 also includes a resistor R9, an adjustable resistor R10, and a decoupling capacitor C3. The resistors R9 and R10 enable the op-amp 904 to provide gain, rather than functioning as a unity gain buffer. Specifically, the gain of the filter may be calculated as shown in equation 6.0, below.

$$\text{Gain} = \frac{R9 + R10}{R9} \quad [6.0]$$

When either hydrophone-filter 900 or 950 is used in seismic exploration, its output usually is recorded in digital form along with the output of a geophone that is co-located with the hydrophone. A digital computer is programmed to mathematically increase or decrease ("scale") the outputs of the filter 900, 950 and the geophone properly so that they will eliminate the surface ghost irrespective of the depth at which the hydrophone and geophone are located. This sum thus provides a signal that is free from surface ghost signals.

Tests

To test the operation of the invention, the filter 950 of the invention was constructed. The components of the filter 950 were selected to match the frequency response of the filter 950 to a hypothetical geophone (not shown) with the following electrical characteristics: a natural frequency of 10 Hz, damping at 70% of critical damping; and a frequency response (magnitude) with a 12 dB/octave slope at frequencies less than 10 Hz.

The components of the filter 950 were selected as shown in Table 1, below.

TABLE 1

| Component Values of Filter 900 | |
|---|---|
| R1 = 6.4 M ohms | C1 = 1800 pF |
| R3 = 8.2 M ohms | voltage of power voltage = 9 V |
| R4 = 8.2 M ohms | C2 = 22 μF |
| R5 = 8.2 M ohms | amplifier 904 = National Semiconductor model LM4250 |
| R6 = 510 ohms | FET 954 = Siliconix model 2N2659 |
| R7 = 100 K ohms | hydrophone = Aquasense crystal assembly |
| R8 = 100 ohms | |

Figure 10:
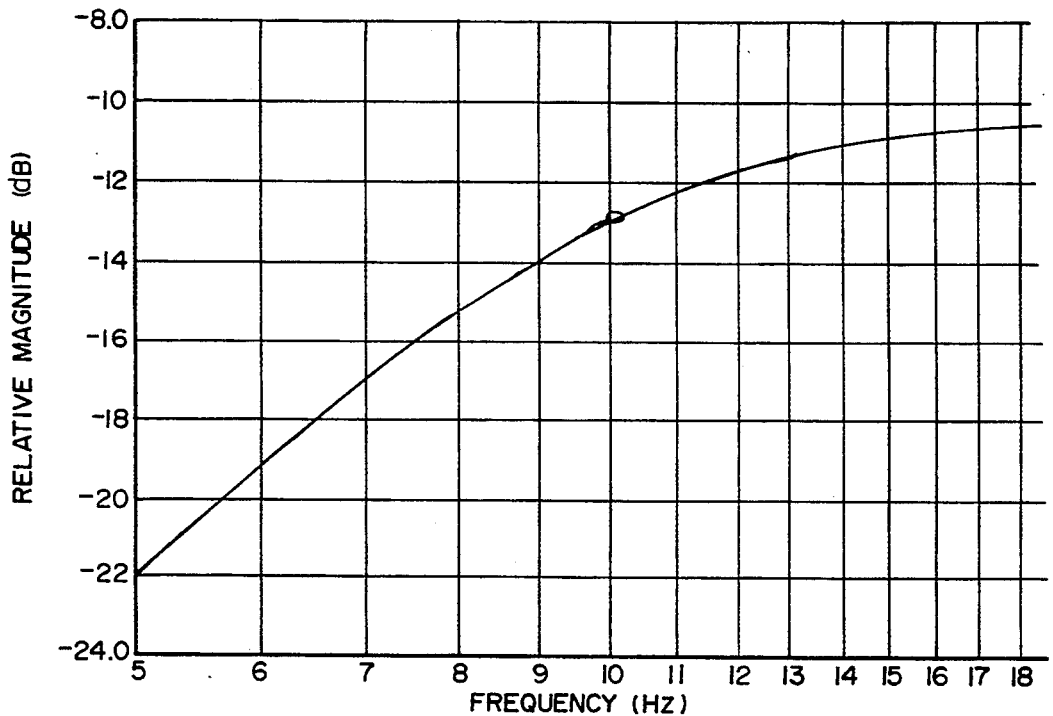
FIG. 10 is a graph illustrating the frequency response (magnitude) of the improved hydrophone-filter of the present invention at two amplitudes of hydrophone output.
Figure 11:
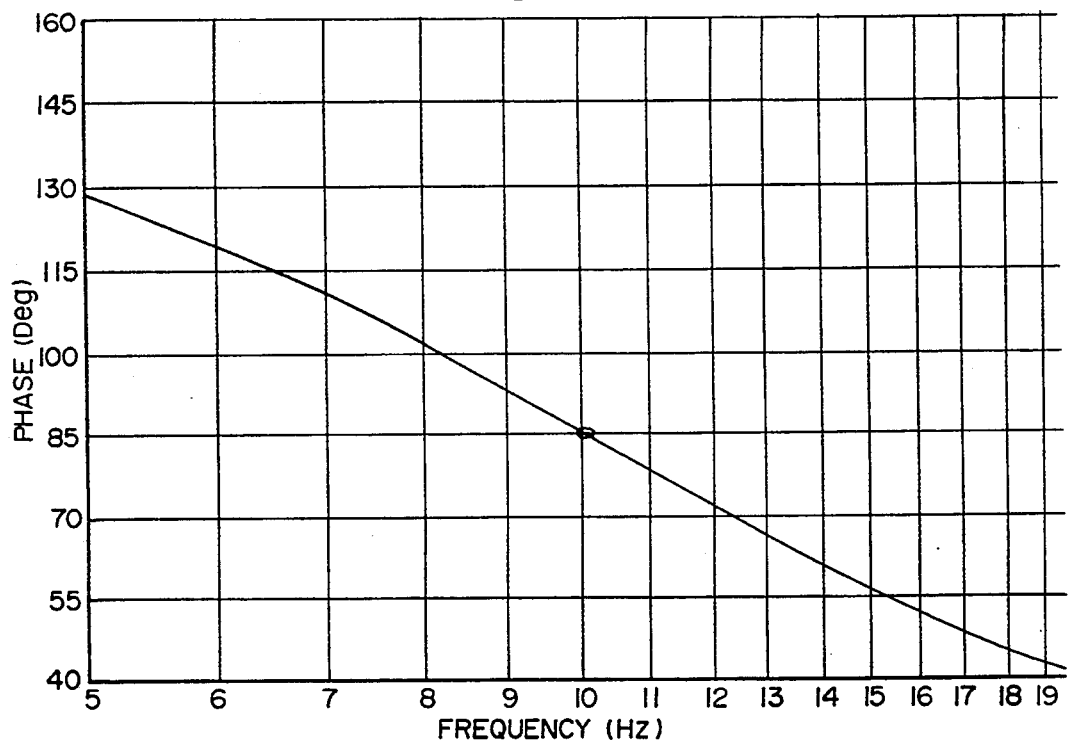
FIG. 11 is a graph illustrating the frequency response (phase) of the improved hydrophone-filter of the present invention at two amplitudes of hydrophone output.

The frequency response (magnitude) of the filter 950 is shown in FIG. 10, and the frequency response (phase) is shown in FIG. 11. For each graph, a first sample frequency response was taken with a first seismic input, and a second frequency response was taken with a second seismic input ten times greater than the first acoustic input. Each curve of FIG. 10 was obtained by comparing the frequency response of the filter 950 to the output of an arbitrarily selected, extended low frequency response standard hydrophone. From FIGS. 10 and 11, it can be seen that neither the frequency response (magnitude) nor the frequency response (phase) of the filter 950 varied when the acoustic input to the hydrophone was increased by a factor of 10.

Conclusion

The present invention provides a number of advantages to its users, since it helps eliminate surface ghost signals received when conducting underwater seismic exploration.

Figure 12:
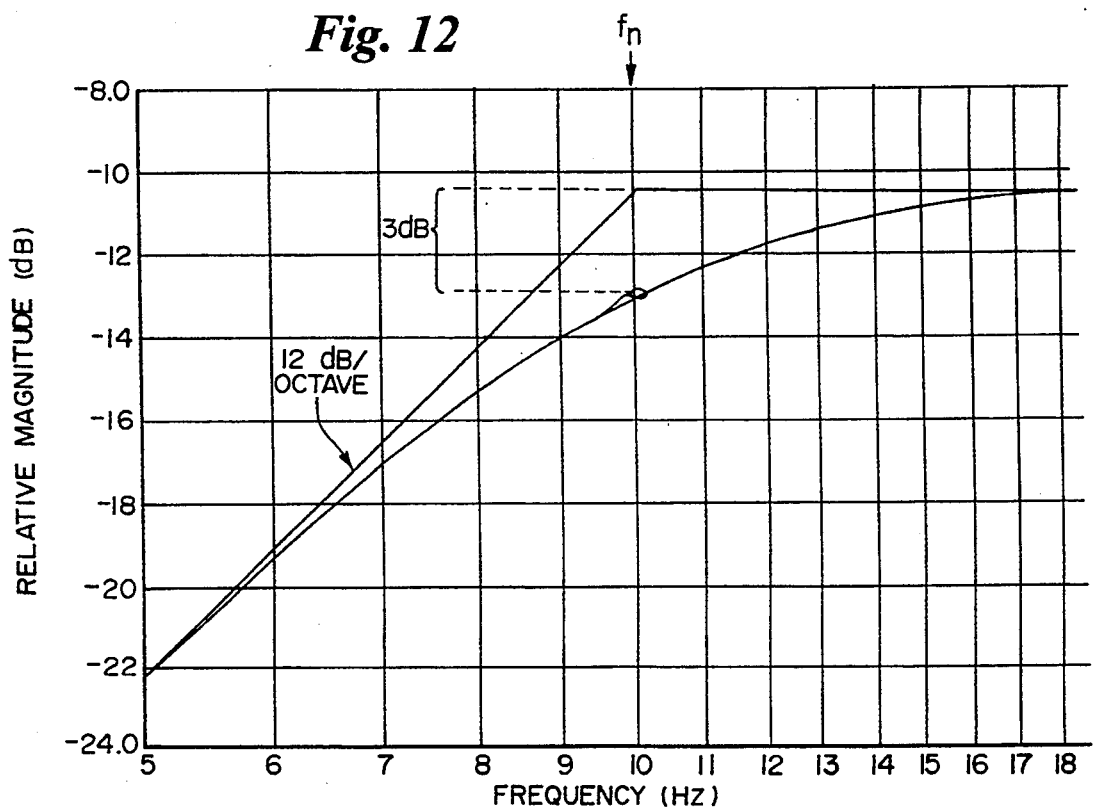
FIG. 12 is a graph comparing the frequency response (magnitude) of a hydrophone-filter of the invention with that of a geophone.
Figure 13:
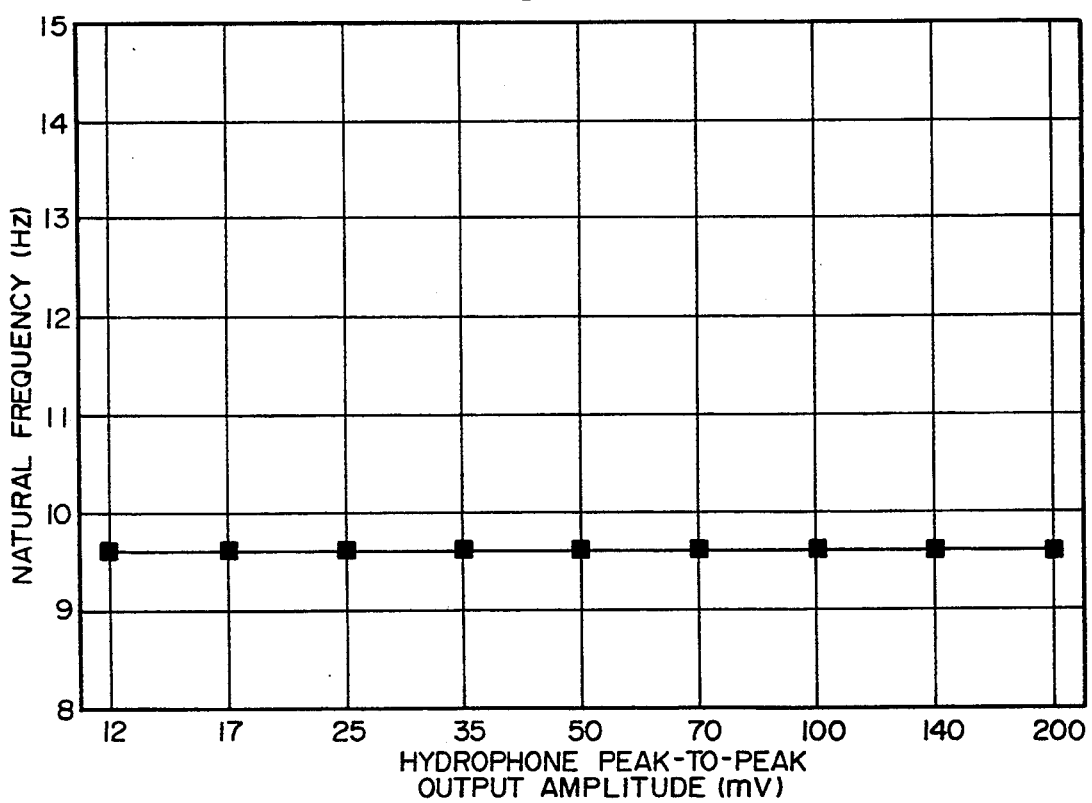
FIG. 13 is a graph illustrating how the natural frequency of the hydrophone-filter of the invention is independent of the output level of the hydrophone.

The invention provides a hydrophone-filter that can be adjusted to provide the same magnitude and phase frequency responses as a geophone, as illustrated in FIG. 12. As shown in FIG. 12, the gain of the hydrophone-filter of the invention at its natural frequency still matches that of the geophone, since the gain is only reduced below the asumptote by 3 dB. Unlike prior arrangements that utilize transformers, the natural frequency of the hydrophone-filter of the invention does not vary with the level of the signal produced by the hydrophone, as demonstrated in FIG. 13; therefore, the invention is useful throughout the operating range of the hydrophone. Additionally, the invention is less costly than prior devices that use transformers, and the invention has less harmonic distortion than such devices.

While there have been shown what are presently considered to be preferred embodiments of the invention, it will be apparent to those skilled in the art that various changes and modifications can be made herein without departing from the scope of the invention as defined by the appended claims.

What is claimed is:

1. An improved apparatus for matching the frequency response of a hydrophone with the frequency response of a geophone, comprising a high-pass second order active filter that includes multiple capacitive elements and multiple resistive elements to determine the natural frequency of the filter, wherein one of the capacitive elements of the filter comprises the hydrophone.

2. The apparatus of claim 1, wherein the hydrophone comprises plural hydrophones arranged in parallel.

3. The apparatus of claim 1, wherein the filter comprises:
   an amplifier;
   a first resistive element electrically connected to an output of the amplifier;
   a hydrophone electrically interposed between ground and the first resistive element;
   a first capacitive element electrically interposed between the hydrophone and an input of the amplifier; and
   a resistive network electrically interposed between the input and ground, to bias the input.

4. The apparatus of claim 1, wherein the filter comprises:
   an operational amplifier;
   a hydrophone electrically connected to ground;
   a capacitive element electrically interposed between the hydrophone and a first input of the amplifier;
   a first resistive element electrically interposed between the hydrophone and a second input of the amplifier;
   a second resistive element electrically interposed between the second input and an output of the amplifier; and
   a resistive network electrically interposed between the first input and ground, to bias the first input.

5. The apparatus of claim 3, wherein the resistive network comprises a resistor.

6. The apparatus of claim 3, wherein the resistive network comprises multiple resistors and a power source arranged to bias the input.

7. The apparatus of claim 4, wherein the first input comprises a non-inverting input and the second input comprises an inverting input.

8. The apparatus of claim 1, wherein the values of the capacitive and resistive elements are selected such that the filter provides a frequency response with a pair of complex conjugate poles.

9. An improved circuit for sensing seismic disturbances, comprising a high-pass second order active filter including one or more resistive elements and multiple capacitive elements, wherein one of the capacitive elements comprises a hydrophone that provides the filter with an input signal.

10. The apparatus of claim 9, wherein the filter comprises:
    an operational amplifier;
    a hydrophone including a first terminal that is electrically grounded, the hydrophone also including an output terminal;
    a resistive element electrically interposed between an output of the amplifier and the hydrophone output terminal;
    a first capacitive element electrically interposed between the hydrophone output terminal and an input of the amplifier; and
    a resistive network electrically interposed between the input and ground to bias the input.

11. The apparatus of claim 10, wherein the resistive network comprises a resistor.

12. The apparatus of claim 10, wherein the resistive network comprises multiple resistors and a power source arranged to bias the input.

13. The apparatus of claim 9, wherein the values of the capacitive and resistive elements are selected such that the filter provides a frequency response curve with a pair of complex conjugate poles.

14. The apparatus of claim 10, wherein the resistive element comprises a first resistor and a second resistor electrically connected in series, wherein the first resistor is electrically connected to the hydrophone output terminal and the second resistor is electrically connected to the output of the amplifier.

15. The apparatus of claim 14, further comprising:
    an electrical connection between a second input of the amplifier and the junction of the first and second resistors; and
    a third resistor electrically interposed between the junction and ground.

16. The apparatus of claim 15, wherein the second resistor comprises an adjustable resistor.

17. An apparatus for measuring seismic waves, comprising:
    a geophone; and
    a hydrophone incorporated into a second order high pass filter that includes one or more resistive and capacitive elements, wherein the hydrophone functions as one of the capacitive elements of the filter, and wherein the resistive and capacitive elements are selected to provide the filter with frequency response characteristics that substantially match those of the geophone.

18. A method of modeling a hydrophone's frequency response after that of a geophone, comprising the steps of amplifying output from a hydrophone with a high-pass second order active filter that includes two capacitive elements and multiple resistive elements to determine the filter's frequency response, wherein one said capacitive element of the filter comprises the hydrophone itself.

19. The method of claim 18, further including the step of selecting the values of the capacitive and resistive elements such that the filter provides a frequency response curve with a pair of complex conjugate poles.

20. The method of claim 18, further including steps comprising:
    simultaneously operating the filter and a geophone, wherein the hydrophone of the filter and the geophone are substantially co-located in a body of water;
    scaling the output of either the geophone or the filter; and obtaining an output signal free from surface ghost signals by summing the scaled output with the non-scaled output.

21. The method of claim 20, wherein the step of summing is performed by a digital computer.

22. An apparatus for shaping the frequency response of a hydrophone, comprising:

a filter to receive an input signal representative of detected pressure from a hydrophone and produce an output signal representative of the detected pressure, wherein the filter has a frequency response that corresponds to that of a geophone, and wherein the filter includes multiple capacitive elements and multiple resistive elements to determine the filter's frequency response.

23. The apparatus of claim 22, wherein the frequency response of the filter includes a natural frequency corresponding to the natural frequency of a geophone, a slope of about 12 dB per octave at frequencies less than the filter's natural frequency, and a slope of about 0 dB per octave at frequencies greater than the filter's natural frequency.

24. The apparatus of claim 23, wherein one of the capacitive elements of the filter comprises the hydrophone.

* * * * *

UNITED STATES PATENT AND TRADEMARK OFFICE
CERTIFICATE OF CORRECTION

PATENT NO. : 5,408,440
DATED : Apr. 18, 1995
INVENTOR(S) : Algernon S. Badger

It is certified that error appears in the above-indentified patent and that said Letters Patent is hereby corrected as shown below:

Column 5, line 6, equation 3.0, each occurence of "ouput" in the numerator and in the denominator should be --output--.

Signed and Sealed this

Twenty-sixth Day of September, 1995

Attest:

BRUCE LEHMAN

*Attesting Officer*     *Commissioner of Patents and Trademarks*